(12) United States Patent
Wales

(10) Patent No.: US 9,581,250 B2
(45) Date of Patent: Feb. 28, 2017

(54) PRESSURISED CONTAINER VALVE

(71) Applicant: LINDE AKTIENGESELLSCHAFT, Munich (DE)

(72) Inventor: Duncan Wales, Castor (GB)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/896,410

(22) PCT Filed: Jun. 30, 2014

(86) PCT No.: PCT/EP2014/063809
§ 371 (c)(1),
(2) Date: Dec. 7, 2015

(87) PCT Pub. No.: WO2014/207255
PCT Pub. Date: Dec. 31, 2014

(65) Prior Publication Data
US 2016/0123474 A1    May 5, 2016

(30) Foreign Application Priority Data
Jun. 28, 2013    (GB) .................................. 1311644.7

(51) Int. Cl.
*F16K 21/04*    (2006.01)
*F16K 31/44*    (2006.01)
(Continued)

(52) U.S. Cl.
CPC .............. *F16K 1/304* (2013.01); *F16K 1/306* (2013.01); *F16K 31/44* (2013.01); *F17C 13/04* (2013.01);
(Continued)

(58) Field of Classification Search
CPC ...... F17C 2205/0329; F17C 2205/0382; F17C 2205/0323; F17C 5/06; F17C 2205/0335;
(Continued)

(56) References Cited

U.S. PATENT DOCUMENTS 3,583,433 A * 6/1971 Lecocq ............... B63C 11/2209
137/505.28
3,595,264 A * 7/1971 Martin .................... F15B 13/01
137/106
(Continued)

FOREIGN PATENT DOCUMENTS

| EP | 0459966 | A2 | 12/1991 |
| FR | 2955170 | A1 | 12/1991 |
| GB | 2237366 | A | 5/1991 |

*Primary Examiner* — Marina Tietjen
*Assistant Examiner* — Seth W MacKay-Smith
(74) *Attorney, Agent, or Firm* — David A. Hey, Esq

(57) ABSTRACT

A valve for a pressurized fluid cylinder. The valve comprises a shut off valve biased against a seat to seal the cylinder. An actuation element is movable linearly to open the valve against the biasing force. A linkage element couples the actuation element to the shut off valve and comprises a first piston towards its top and a second piston towards its bottom. The valve also comprises a gas refill inlet between the pistons such that refill gas pressure biases the linkage element away from the valve. The actuation element is a depressed position pushes against the linkage element to hold the linkage element down and the valve open so that the cylinder can be refilled. When the actuation element is in a non-depressed position, the linkage element is free to move with the refill gas pressure so that it is spaced from the valve.

1 Claim, 1 Drawing Sheet

(51) Int. Cl.
*F16K 1/30* (2006.01)
*F17C 13/04* (2006.01)

(52) U.S. Cl.
CPC .. *F17C 2201/056* (2013.01); *F17C 2201/058* (2013.01); *F17C 2205/0329* (2013.01); *F17C 2205/0335* (2013.01); *F17C 2205/0385* (2013.01); *F17C 2205/0391* (2013.01); *F17C 2205/0394* (2013.01); *F17C 2221/011* (2013.01); *F17C 2223/0123* (2013.01)

(58) Field of Classification Search
CPC ....... F16K 1/306; F16K 1/307; Y02E 60/321; Y10T 137/7782; Y10T 137/7853; G05D 16/10
USPC .......................................................... 251/20
See application file for complete search history.

(56) References Cited

U.S. PATENT DOCUMENTS

| | | | | |
|---|---|---|---|---|
| 3,884,262 A | * | 5/1975 | Assembergs | B29C 45/82 137/115.25 |
| 3,952,993 A | * | 4/1976 | Roberts | B60T 8/342 251/20 |
| 4,989,832 A | | 2/1991 | Kremer | |
| 5,033,499 A | | 7/1991 | Patel et al. | |
| 5,088,516 A | * | 2/1992 | Fisher | B64D 25/14 137/468 |
| 6,105,632 A | * | 8/2000 | Buhlmann | A62B 9/02 141/18 |
| 6,505,838 B1 | * | 1/2003 | Cavaliere | G05D 16/10 277/436 |
| 7,222,836 B2 | * | 5/2007 | Chen | F16K 1/303 137/505.42 |
| 8,485,218 B2 | * | 7/2013 | Lemmers, Jr. | G05D 16/10 137/454.6 |
| 8,899,258 B2 | * | 12/2014 | Ginder | F16K 1/00 137/182 |
| 9,500,296 B2 | * | 11/2016 | Wadham | F16K 1/30 |
| 2007/0272307 A1 | * | 11/2007 | Patterson | G05D 16/10 137/505.13 |
| 2010/0319804 A1 | * | 12/2010 | Moretti | F17C 13/04 141/1 |
| 2014/0048169 A1 | * | 2/2014 | Pisot | F16K 1/306 141/4 |

* cited by examiner

PRESSURISED CONTAINER VALVE

The present invention relates to a valve for use in pressurised containers or gas bottles.

Gas bottles are typically sealed by urging a sliding/moveable member against a gas valve seat. This moveable member may be located either within or without the gas bottle. In the event that it is located within the gas bottle, it is urged closed by the high gas pressure inside the bottle and opened, when required, using a handwheel or lever. Once the valve has been opened in this way, high pressure gas is then driven through the valve into the bottle. An example of such a system is shown in US 2005/0173007.

In some situations, during refill, the pressurised gas may be passed through the valve before the valve has been opened using either the handwheel or the lever. This might happen for instance if the operator is tired or distracted. In these situations, the high pressure gas may itself generate enough force to open the valve and enter the bottle. However, the valve in this situation may chatter against the valve seat (due to the biasing force on the valve and the irregular force coming from the incoming gas). When certain gases are used, for instance oxygen, such chattering may present a risk of ignition.

Thus the present invention is directed towards a gas bottle which cannot be filled when such a handwheel or lever has not been first depressed.

Accordingly, the present invention provides a valve for a pressurised fluid cylinder, with a bore containing a valve assembly. The valve assembly includes a shut off valve biased against a seat to seal the cylinder; an actuation element movable linearly to open the valve against the biasing force; and a linkage element coupling the actuation element to the shut off valve. A first piston located towards the top of the linkage element seals with a first portion of the bore having a first diameter, and a second piston towards the bottom of the linkage element seals in a first position with a second portion of the bore having a second diameter less than the first diameter. The linkage element is movable to a second position in which the second piston enters a third portion of the bore having a diameter greater than the second diameter, such that the second position is no longer sealed with the bore. A gas refill inlet communicates with the second portion of the bore. The first piston includes a face exposed to the gas refill inlet which is larger than a face of the second piston exposed to the gas refill inlet, such that refill gas pressure biases the linkage element away from the valve. When the actuation element is in a depressed position, it pushes against the linkage element to hold the linkage element down and the valve open so that the cylinder can be refilled. When the actuation element is in a non-depressed position, the linkage element is free to move with the refill gas pressure so that it is spaced from the valve.

When the actuation element is in its first, non-depressed, position the pressure of the incoming fluid acts on solely the first and second pistons. Since the diameter of the first piston is more than that of the second piston, the pressure from the gas creates a net force towards the first piston, forcing the linkage element away from the shut off valve. The seal between the second piston and the bore in this position prevents the refill gas from reaching the shut off valve. The valve therefore cannot be opened by the refill gas when the actuation element is not depressed, so that the problem of 'chatter' cannot arise.

Only when the linkage element is moved into its second position by the operator moving the actuation element can gas flow past the second position to refill the cylinder.

The invention will now be described in detail, by way of example only, with reference to the accompanying drawings, in which:

FIG. 1A shows the valve in a first closed position and FIG. 1B shows the valve in a second open position.

Figure 1A:
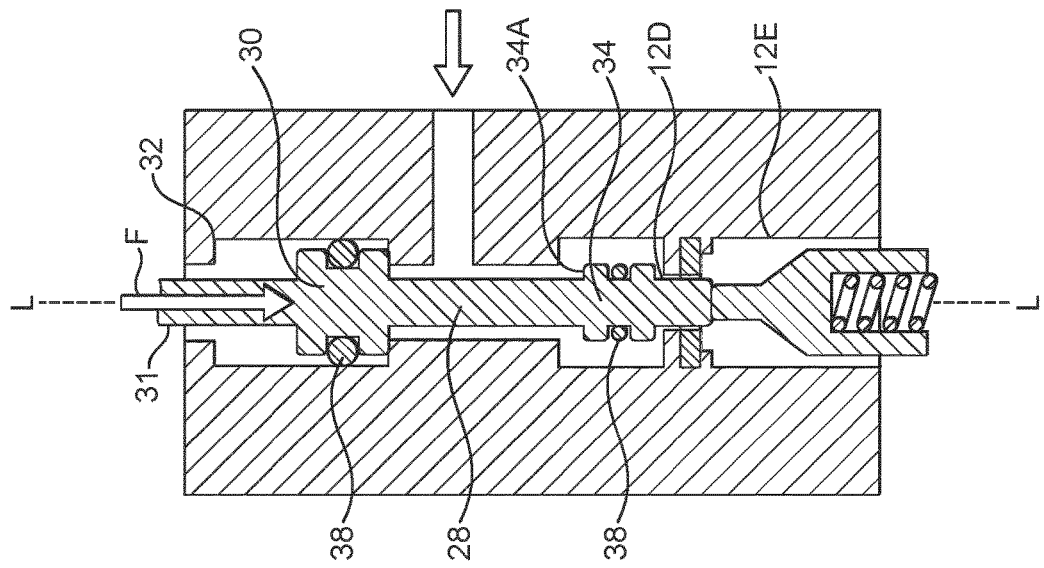
FIGS. 1A and 1B show a valve according to the present invention.

The valve 10 therein shown is formed of a body 11 having a valve bore 12 which has a generally cylindrical shape. The valve bore 12 has a longitudinal axis L-L. A refill inlet 14 delivers gas from a pressurised source (not shown) and comprises an inlet passage 20 which is fluidly connected to the valve bore 12 through the valve body 11 via an opening in the bore's side wall. A seat 26 leading to the gas cylinder is located at the bottom of the bore 12, whilst a control port 18 forms an opening in the top of the valve bore 12.

A shut off valve 22 is located below the seat 26 and is biased by a spring 24 into a closed position and into engagement with the valve seat 26.

A linkage element 28, generally cylindrical in shape, is located inside the valve bore 12 and is movable along axis L-L. At the top of the linkage element 28 is a first piston 30 which, in a first position, engages with the side wall of the valve bore 12 and has a top surface which contacts a shoulder 32 in the valve bore 12. Connected to this top surface of the piston 30 is an actuation element 31 (for instance, a lever) which is operated by a user to depress the linkage element 28. Towards the bottom of the linkage element 28 is a second piston 34 which in a first position engages with the side wall of the valve bore 12. Located at the bottom of the linkage element 28 is a contact surface 36 which selectively bears against the shut off valve 22.

As is shown in FIG. 1A, the first and second pistons straddle the refill inlet 14.

The bottom surface of the first piston 30 and the top surface of the second piston 34 each define a respective gas contact area 30A; 34A which is defined by the cross sectional area of the piston 30; 34 less the cross sectional area of the linkage element 28 between the pistons. In the closed position of the valve (FIG. 1A), pressurised gas coming from the refill inlet 14 acts on both these contact areas 30A; 34A. The first piston 30 has a larger gas contact area than that of the second piston 34.

To prevent fluid leaking past the first and second pistons 30; 34 when in the closed position, each piston has a circumferential o-ring seal 38 which engages with the side wall of the valve bore 12.

Figure 1B:
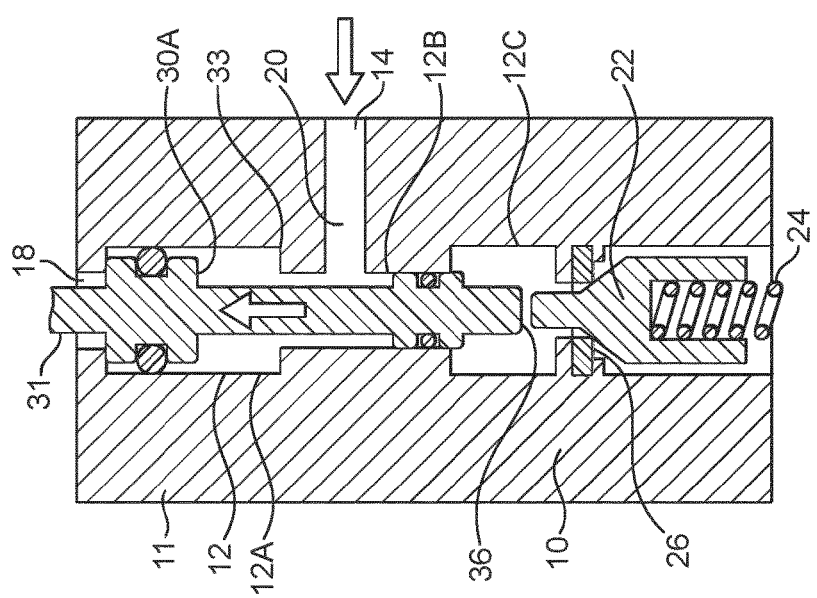

The diameter of the bore 12 is stepped along its axis L-L as shown in FIGS. 1A and 1B and is generally formed of five portions. A first topmost portion 12A of the bore has a first diameter which is sized to seal against the diameter of the first piston 30. Beneath the first portion of the bore 12 is a second portion 12B which has a second diameter which is less than that of the first portion 12A and which is sized to seal against the diameter of the second piston 34 when the valve is in its closed position. Beneath the second portion 12B is a third portion 12C which has a larger diameter than that of the second portion 12B. A fourth portion 12D beneath the third portion 12C of the bore is sized to accommodate the valve seat 26 whilst the fifth and bottommost portion 12E is sized to accommodate the check valve 22 with clearance.

If a user attempts to refill the cylinder when the valve 10 and the actuation element 31 are in the closed position shown in FIG. 1A, pressurised gas which enters the valve bore 12 from the refill inlet 14 acts on the gas contact areas 30A; 34A. Since the gas contact area 30A of the first piston 30 is larger than the gas contact area 34A of the second piston 34, the net force from the pressurised gas in the valve bore 12 forces the linkage element 28 upwards and the top surface of the first piston 30 into engagement with the shoulder 32 at the top of the bore 12. This brings the second piston 34 into the second portion 12B of the bore, thereby sealing the path to the shut off valve 22. Thus in the closed position, the pressurised gas is contained between the two pistons 30; 34. Therefore the refill unit cannot supply fluid to the gas cylinder.

When a user requires refill gas to be delivered to a gas cylinder, they depress the linkage element 28 by using the actuation element 31 to exert a downward force F on the top surface of the first piston 30 which exceeds the net force applied by the pressurised gas on the linkage element 28 and the spring 24. The downward force applied to the top surface of the first piston 30 forces the linkage element 28 and hence the check valve 22 downwards into the valve's second, open, position shown in FIG. 1B.

In this open position, whilst the first piston 30 is still sealed with the first portion 12A and the side wall of the valve bore 12, its top surface disengages from the shoulder 32 and a portion of its gas contact area 30A lands on a second shoulder 33 in the valve bore 12 (which is defined by the interface between the first and second portions of the bore 12). This shoulder 33 prevents the linkage element 28 from moving beyond its second position. Also in the open position, the second piston 34 moves beyond the side wall of the second portion 12B of the valve bore 12 into the third portion 12C of the bore 12; and the contact surface 36 makes contact with the shut off valve 22, forcing the shut off valve downwards and apart from its valve seat 26. Thus in the open position the pressurised gas from the refill inlet 14 can pass around the second piston 34, through the open shut off valve 22, and into the gas cylinder.

When enough gas has been supplied to the gas cylinder, the gas supply from the refill unit (not shown) connected to the inlet 14 can be isolated, shutting off the supply of pressurised gas flowing through the bore 12. The downward force F from the user applied using the actuation element 31 can then be removed. In so doing, the pressure from the gas cylinder and the force from the spring 24 closes the shut off valve 22.

Although the above valve has been described with reference to pressurised gas being fed from the inlet 14, past the check valve 22 and into a cylinder when the actuation element is depressed; it will be appreciated that in normal use (i.e. when the cylinder is not being refilled) the shut off valve 22 can be pushed down such to allow pressurised gas from a cylinder to pass around the check valve when the actuation element 31 is depressed and out through the refill inlet 14 (which becomes the outlet of the valve).

The invention claimed is:
1. A valve for a pressurised fluid cylinder, the valve comprising:
   a housing with a bore containing a valve assembly, the valve assembly comprising:
      a shut off valve biased against a seat to seal the cylinder;
      an actuation element movable linearly to open the valve against the biasing force; and
      a linkage element coupling the actuation element to the shut off valve;
      a first piston towards the top of the linkage element sealed with a first portion of the bore having a first diameter,
      a second piston towards the bottom of the linkage element sealed in a first position with a second portion of the bore having a second diameter less than the first diameter, the linkage element being movable to a second position in which the second piston enters a third portion of the bore having a diameter greater than the second diameter, such that the second piston is no longer sealed with the bore;
      a gas refill inlet communicating with the second portion of the bore; the first piston having a face exposed to the gas refill inlet which is larger than a face of the second piston exposed to the gas refill inlet, such that refill gas pressure biases the linkage element away from the valve;
   wherein the actuation element in a depressed position pushes against the linkage element to hold the linkage element down and the valve open so that the cylinder can be refilled; and
   wherein when the actuation element is in a non-depressed position, the linkage element is free to move with the refill gas pressure so that it is spaced from the valve.

* * * * *